(12) United States Patent
Itoi et al.

(10) Patent No.: US 11,894,559 B2
(45) Date of Patent: Feb. 6, 2024

(54) DISPERSANT COMPOSITION FOR CARBON NANOTUBE

(71) Applicant: Kao Corporation, Tokyo (JP)

(72) Inventors: Akito Itoi, Wakayama (JP); Yutaro Kinoshita, Wakayama (JP); Atsushi Hiraishi, Wakayama (JP); Takahiro Yano, Wakayama (JP); Akihiro Koyama, Wakayama (JP)

(73) Assignee: KAO CORPORATION, Tokyo (JP)

( * ) Notice: Subject to any disclaimer, the term of this patent is extended or adjusted under 35 U.S.C. 154(b) by 63 days.

(21) Appl. No.: 17/602,538

(22) PCT Filed: Dec. 27, 2019

(86) PCT No.: PCT/JP2019/051583
§ 371 (c)(1),
(2) Date: Oct. 8, 2021

(87) PCT Pub. No.: WO2020/208880
PCT Pub. Date: Oct. 15, 2020

(65) Prior Publication Data
US 2022/0173403 A1    Jun. 2, 2022

(30) Foreign Application Priority Data

Apr. 12, 2019    (WO) ................. PCT/JP2019/015909

(51) Int. Cl.
| | |
|---|---|
| *H01M 4/525* | (2010.01) |
| *H01B 1/24* | (2006.01) |
| *C08K 3/04* | (2006.01) |
| *H01M 4/62* | (2006.01) |
| *C08F 220/20* | (2006.01) |
| *C08F 220/68* | (2006.01) |
| *C08L 27/16* | (2006.01) |
| *B82Y 30/00* | (2011.01) |
| *B82Y 40/00* | (2011.01) |
| *H01M 4/02* | (2006.01) |

(52) U.S. Cl.
CPC ........... *H01M 4/625* (2013.01); *C08F 220/20* (2013.01); *C08F 220/68* (2013.01); *C08K 3/041* (2017.05); *C08L 27/16* (2013.01); *H01B 1/24* (2013.01); *H01M 4/525* (2013.01); *H01M 4/623* (2013.01); *B82Y 30/00* (2013.01); *B82Y 40/00* (2013.01); *C08L 2203/20* (2013.01); *H01M 2004/028* (2013.01)

(58) Field of Classification Search
CPC ... H01B 1/00; H01B 1/05; H01B 1/06; H01B 1/24; H01M 4/625; C08K 3/041
See application file for complete search history.

(56) References Cited

U.S. PATENT DOCUMENTS

| | | | |
|---|---|---|---|
| 2015/0028264 A1* | 1/2015 | Kuwahara ............. | H01M 4/623 252/506 |
| 2015/0132643 A1 | 5/2015 | Sasaki | |
| 2016/0126553 A1* | 5/2016 | Murase ................. | H01M 4/525 524/401 |
| 2018/0201797 A1 | 7/2018 | Taniguchi et al. | |
| 2018/0366731 A1 | 12/2018 | Takahashi et al. | |
| 2019/0074538 A1* | 3/2019 | Lee ....................... | H01M 4/625 |
| 2019/0190008 A1 | 6/2019 | Takizawa | |
| 2020/0295371 A1 | 9/2020 | Ishida et al. | |

FOREIGN PATENT DOCUMENTS

| | | |
|---|---|---|
| CA | 694863 A | 9/1964 |
| CN | 101420035 A | 4/2009 |

(Continued)

OTHER PUBLICATIONS

English language translation of form PCT/ISA/237 (dated Feb. 18, 20).*

(Continued)

*Primary Examiner* — Mark Kopec
(74) *Attorney, Agent, or Firm* — Birch, Stewart, Kolasch & Birch, LLP

(57) ABSTRACT

The present invention relates to a dispersant composition for carbon nanotubes, containing: a copolymer that includes a structural unit A represented by the following general formula (1) and a structural unit B represented by the following general formula (2); and a solvent, wherein the content of the structural unit B in all structural units of the copolymer is 20 mass % or more. In the following formulae, $R^1$, $R^2$, $R^3$, $R^5$, $R^6$, and $R^7$ are the same or different from each other and are each a hydrogen atom, a methyl group, or an ethyl group, $R^4$ is a hydrocarbon group having 16 to 30 carbon atoms, $R^8$ is a linear or branched alkylene group having 2 to 3 carbon atoms, $X^1$ is on oxygen atom or NH, $X^2$ is an oxygen atom, p is the number of 1 to 8, and $R^9$ is a hydrogen atom, a methyl group, or an ethyl group.

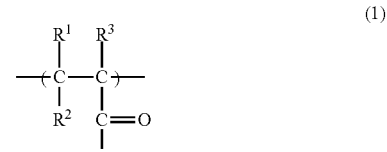

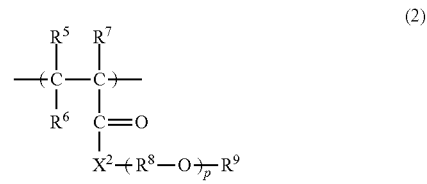

15 Claims, No Drawings

(56) References Cited

FOREIGN PATENT DOCUMENTS

| | | | |
|---|---|---|---|
| CN | 104205444 A | 12/2014 | |
| JP | 1-254237 A | 10/1989 | |
| JP | 2004-3087 A | 1/2004 | |
| JP | 2004-281055 A | 10/2004 | |
| JP | 2010-229288 A | 10/2010 | |
| JP | 2012-166154 A | 9/2012 | |
| JP | 2014-123495 A | 7/2014 | |
| JP | 2014-135275 A | 7/2014 | |
| JP | 2015-128006 A | 7/2015 | |
| JP | 2015-135773 A | 7/2015 | |
| JP | 2015-199623 A | 11/2015 | |
| JP | 2016-177925 A | 10/2016 | |
| JP | 2017-91859 A | 5/2017 | |
| JP | 2017-228412 A | 12/2017 | |
| JP | 6285857 B2 | 2/2018 | |
| JP | 2018-142451 A | 9/2018 | |
| JP | 2018-170218 A | 11/2018 | |
| JP | 2018-170219 A | 11/2018 | |
| JP | 2018-197341 A | 12/2018 | |
| JP | 2019-46796 A | 3/2019 | |
| WO | WO 2013/150778 A1 | 10/2013 | |
| WO | WO 2013/151062 A1 | 10/2013 | |
| WO | WO 2013/161786 A1 | 10/2013 | |
| WO | WO 2017/110901 A1 | 6/2017 | |
| WO | WO 2018/061622 A1 | 4/2018 | |

OTHER PUBLICATIONS

Lahelin et al "In situ polymerization of methyl methacrylate/multi-walled carbon nanotube composites using cationic stearyl methacrylate copolymers as dispersants", European Polymer Journal 47 (2011) 873-881.*

Spitalsky et al "Carbon nanotube-polymer composites: Chemistry, processing, mechanical and electrical properties", Progress in Polymer Science 35 (2010) 357-401.*

Chern et al "Emulsion Polymerization of Styrene Stabilized with an Amphiphilic PEG-Containing Graft Copolymer", Macromol. Chem. Phys. 2001, 202, 2750±2759.*

International Search Report (PCT/ISA/210) issued in PCT/JP2019/015909, dated Jun. 18, 2019.

International Search Report (PCT/ISA/210) issued in PCT/JP2019/051583, dated Feb. 18, 2020.

Pérez-Martínez et al., "Miniemulsion copolymerization of (meth)acrylates in the presence of functionalized multiwalled carbon nanotubes for reinforced coating applications," Beilstein Journal of Nanotechnology, vol. 8, 2017, pp. 1328-1337.

Chern et al., "Emulsion Polymerization of Styrene Stabilized with an Amphiphilic PEG-Containing Graft Copolymer," Macromolecular Chemistry and Physics, vol. 202, No. 13, 2001, pp. 2750-2759.

English translation of the Written Opinion of the International Searching Authority for International Application No. PCT/JP2019/051591, dated Mar. 17, 2020.

Extended European Search Report for European Application No. 19923780.1, dated Mar. 31, 2023.

International Search Report for PCT/JP2019/015908 dated Jul. 16, 2019.

International Search Report for PCT/JP2019/051591 dated Mar. 17, 2020.

U.S. Appl. No. 17/602,580, filed Oct. 8, 2021.

Extended European Search Report for European Application No. 19924404.7, dated Dec. 8, 2022.

Yasunaga et al., "Dynamic behaviour of water in hydrogel containing hydrophobic side chains as studied by pulse 1H NMR," Journal of Molecular Structure, vol. 602-603, 2002, pp. 399-404.

Zhang et al., "The effects of organic modifier on physicochemical and chromatographic characteristics of self-assembled micelle from poly (stearyl methacrylate-co-methacrylic acid) in electrokinetic chromatography," Electrophoresis, vol. 37, 2016, pp. 2226-2234.

* cited by examiner

DISPERSANT COMPOSITION FOR CARBON NANOTUBE

TECHNICAL FIELD

The present invention relates to a dispersant composition for carbon nanotubes, a conductive material dispersion, and a positive electrode paste for batteries.

BACKGROUND ART

Recent attempts to mitigate global warming have created incentives for active development of electric automobiles that do not emit carbon dioxide. Disadvantages of electric automobiles compared to gasoline-powered automobiles are their short travel range and time required for charging their batteries. In order to shorten the time required for charging, it is necessary to increase the speed of electron transfer in positive electrodes. Carbon black is a material currently used as a conductive aid (conductive material) in positive electrodes for non-aqueous electrolyte batteries. However, a conductive material having a lower electronic resistance than carbon black is desired in this use.

Examples of the conductive material having a lower electronic resistance than carbon black include carbon nanotubes (may be referred to as "CNTs" hereinafter), which are expected to be applicable to a variety of fields owing to their physical and chemical properties. CNTs have a high aspect ratio. Thus, conductive paths can be formed with the use of a small amount of CNTs. A CNT is a nano-carbon material substantially in a cylindrical shape formed of a seamlessly rolled graphite sheet(s). CNTs composed of a single layer of rolled graphite sheet are called "single-walled CNTs", and CNTs composed of multiple concentric layers of rolled graphite sheets are called "multi-walled CNTs".

JP 2012-166154A (Patent Document 1) discloses a carbon material dispersion containing: as a dispersant, a copolymer of stearyl methacrylate and polyoxypropylene (the average number of moles added: 14) methacrylate; a carbon material such as CNTs; and an organic solvent. JP H1(1989)-254237A (Patent Document 2) discloses, as a dispersant, a copolymer containing a structural unit derived from stearyl methacrylate and a structural unit derived from methoxy polyethylene glycol (the average number of moles added: 23) methacrylate. Japanese Patent No. 6285857 (Patent Document 3) discloses a positive electrode paste for batteries, containing a positive electrode active material, acetylene black, a solvent, and a copolymer of, e.g., stearyl methacrylate and methoxy polyethyleneglycol methacrylate (PEG(2)MA).

DISCLOSURE OF INVENTION

In one aspect, the present invention relates to a dispersant composition for carbon nanotubes containing: a copolymer that includes a structural unit A represented by the following general formula (1) and a structural unit B represented by the following general formula (2); and a solvent, wherein the content of the structural unit B in all structural units of the copolymer is 20 mass % or more.

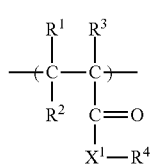

(1)

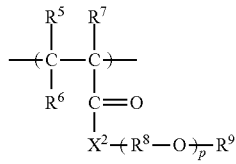

(2)

In the above formulae, $R^1$, $R^2$, $R^3$, $R^5$, $R^6$, and $R^7$ are the same or different from each other and are each a hydrogen atom, a methyl group, or an ethyl group, $R^4$ is a hydrocarbon group having 16 to 30 carbon atoms, $R^8$ is a linear or branched alkylene group having 2 or 3 carbon atoms, $X^1$ is an oxygen atom or NH, $X^2$ is an oxygen atom, p is the number of 1 to 8, and $R^9$ is a hydrogen atom, a methyl group, or an ethyl group.

In another aspect, the present invention relates to a conductive material dispersion containing: the dispersant composition for carbon nanotubes of the present invention; and carbon nanotubes.

In still another aspect, the present invention relates to a positive electrode paste for a battery, containing: the conductive material dispersion of the present invention; a positive electrode active material; and a binder.

DESCRIPTION OF THE INVENTION

In order to obtain a CNT containing positive electrode paste for batteries, it is required to break a thick bundle or firm aggregate of several tens of CNTs and to highly disperse the CNTs, thereby efficiently forming conductive paths with a small number of CNTs in a positive electrode mixture layer. As means for obtaining such a positive electrode paste, it is necessary to use a dispersion in which CNTs are highly dispersed in a solvent in preparation of the positive electrode paste. However, CNTs, which are in the form of thin threads, are liable to break, and thus cannot be dispersed in organic solvents as easily as carbon black.

In light of the foregoing, the present invention provider a dispersant composition for carbon nanotubes (also referred to as a "CNT dispersant composition" in the following) that enables preparation of a conductive material dispersion in which CNTs exhibit high dispersibility and also provides a conductive material dispersion in which CNTs exhibit high dispersibility. The present invention further provides a positive electrode paste for batteries, prepared using the conductive material dispersion.

The present invention is based on the finding that the dispersibility of CNTs in a conductive material dispersion is improved by the presence of a specific copolymer in the conductive material dispersion.

In the present invention, the mechanism by which the dispersibility of CNTs in the conductive material dispersion is improved is presumed as follows, although the details of the mechanism have not been clarified.

In the present invention, a copolymer including a structural unit A that is adsorbed on CNTs and a structural unit B that dissolves in a solvent is contained as a dispersant for CNTs. CNTs can be highly dispersed in a solvent presumably because, in a state where the structural unit A holds the CNTs, the structural unit B spreads toward a solvent to cause steric repulsion, whereby strong steric repulsive forces are applied between the CNTs. However, the present, invention should not be construed as being limited to the above described mechanism. The dispersibility of CNTs in a conductive material dispersion can be evaluated based on the viscosity of the conductive material dispersion. The smaller the viscosity, the better the dispersibility of the CNTs.

In one aspect, the present invention relates to a CNT dispersant composition that contains the following components B and C.

Component B: a copolymer that includes a structural unit A represented by the following general formula (1) and a structural unit B represented by the following general formula (2) with the content of the structural unit B in all structural units of the copolymer being 20 mass % or more Component C: a solvent In another aspect, the present invention relates to a conductive material dispersion that contains the following components A to C.

Component A: CNTs

Component B: a copolymer that includes a structural unit A represented by the following general formula (1) and a structural unit B represented by the following general formula (2) with the content of the structural unit B in all structural units of the copolymer being 20 mass % or more Component C: a solvent

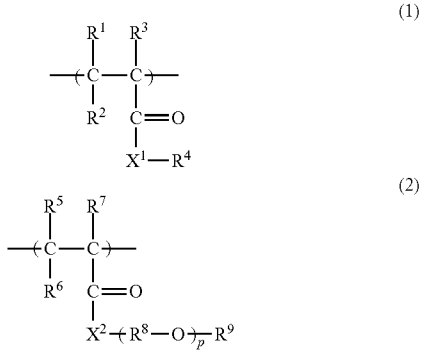

In the above formulae, $R^1$, $R^2$, $R^3$, $R^5$, $R^6$, and $R^7$ are the same or different from each other and are each a hydrogen atom, a methyl group, or an ethyl group, $R^4$ is a hydrocarbon group having 16 to 30 carbon atoms, $R^8$ is a linear or branched alkylene group having 2 or 3 carbon atoms, $X^1$ is an oxygen atom or NH, $X^2$ is an oxygen atom, p is the number of 1 to 8, and $R^9$ is a hydrogen atom, a methyl group, or an ethyl group.

The present invention can provide a dispersant composition for carbon nanotubes that enables preparation of a conductive material dispersion in which carbon nanotubes exhibit high dispersibility and also can provide a conductive material dispersion in which carbon nanotubes exhibit high dispersibility. Further, by using a positive electrode paste for batteries prepared using the conductive material dispersion of the present invention, the dispersibility of carbon nanotubes in a positive electrode mixture layer is also improved, whereby the resistance of the positive electrode mixture layer can be reduced.

CNTs (Component A)

In the present disclosure, CNTs may mean the totality of a plurality of CNTs. The form of CNTs used in preparation of the CNT dispersant composition and conductive material dispersion of the present invention may not be limited to particular forms. For example, a plurality of CNTs may be present independently of each other or may be bundled up or entangled with each other, or alternatively, CNTs in these forms may be present in any desired combination. Them is no limitation on the number of layers in CNTs or the diameter of CNTs. CNTs may contain impurities (e.g., a catalyst or amorphous carbon) derived from the process for producing the CNTs.

In one or more embodiments, CNTs have a cylindrical shape formed of a seamlessly rolled graphite sheet(s). CNTs composed of a single layer of rolled graphite sheet are called "single-walled CNTs (SWCNTs)", CNTs composed of two layers of rolled graphite sheets are called "double-walled CNTS (DWCNTs)", and CNTs composed of three or more layers of rolled graphite sheets are called "multi-walled CNT's (MWCNTs)". Depending on the properties required a positive electrode mixture layer to be obtained by using a positive electrode paste for batteries containing the conductive material dispersion of the present invention, either single-walled, double-walled, or multi-walled CNTs or a mixture thereof can be used. In order to obtain a positive electrode mixture layer that allows good dispersion of CNTs and has a low resistance, it is preferable to use multi-walled CNTs.

The average diameter of CNTs is measured using a scanning electron microscope (SEM) or atomic force microscope (AFM). In the present invention, the average diameter of CNTs is not limited to particular values. The average diameter is preferably 3 nm or more, more preferably 5 nm or more, and still more preferably 8 nm or more, from the viewpoint of improving the dispersibility of the CNTs, and is preferably 100 nm or less, more preferably 50 nm, or less, still more preferably 30 nm or less, even more preferably 2.0 nm or less, and yet more preferably 15 nm or less, from the viewpoint of improving the conductivity. Specifically, the average diameter of CNTs is preferably 3 nm or more and 100 nm or less, more preferably 3 nm or more and 50 nm or less, still more preferably 3 nm or more and 30 nm or less, even more preferably 5 nm or more and 20 nm or less, yet more preferably 8 nm or more and 20 nm or less, and yet more preferably 8 nm or more and 15 nm or less.

The average length of CNTs is measured using a scanning electron microscope (SEM) or an atomic tome microscope (AFM). In the present invention, the average length of CNTs is not limited to particular values. The average length is preferably 2 µm or more, more preferably 5 µm or more, still more preferably 10 µm or more, and even more preferably 30 µm or more, from the viewpoint of improving the conductivity, and is preferably 500 µm or less, more preferably 300 µm or less, still more preferably 200 µm or less, and even more preferably 120 µm or less, from the viewpoint of improving the dispersibility. Specifically, the average length of CNTs is preferably 2 µm or more and 500 µm or less, more preferably 5 µm or more and 300 µm or less, still more preferably 10 µm or more and 200 µm or less, and even more preferably 30 µm or more and 120 µm or less.

The content of impurities in CNTs is measured through thermogravimetric analysis or the like. In the present invention, the content of impurities is preferably as small as possible. The content of impurities in CNTs is preferably 40 mass % or less, more preferably 30 mass % or less, still more preferably 20 mass % or less, even more preferably 10 mass % or less, and yet more preferably substantially 0 mass %, from the viewpoint of increasing the effective CNT concentration.

The content of the component A in the conductive material dispersion of the present invention is preferably 1 mass % or more, more preferably 2 mass % or more, and still more preferably 3 mass % or more, from the viewpoint of improving the convenience of adjusting the concentration of a positive electrode paste, and is preferably 10 mass % or less, more preferably 8 mass % or less, and still more preferably 7 mass % or less, from the viewpoint of providing the viscosity that allows the dispersion to be handled easily. Specifically, the content of the component A in the conductive material dispersion of the present invention is preferably 1 to 10 mass %, more preferably 2 to 8 mass %, and still more preferably 3 to 7 mass %.

Copolymer (Component B)

The component B contained in the CNT dispersant composition or the conductive material dispersion according to the present invention includes the structural unit A represented by the following general formula (1) and the structural unit B represented by the following general formula (2).

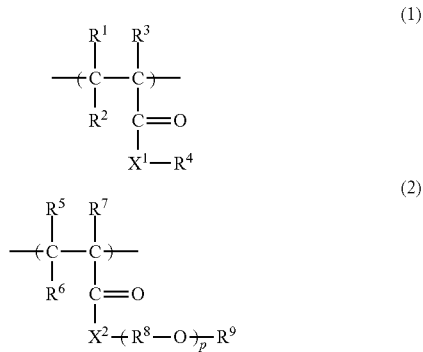

In the above formulae, $R^1$, $R^2$, $R^3$, $R^5$, $R^6$, and $R^7$ are the same or different from each other and are each a hydrogen atom, a methyl group, or an ethyl group, $R^4$ is a hydrocarbon group having 16 to 30 carbon atoms, $R^8$ is a linear or branched alkylene group having 2 or 3 carbon atoms, $X^1$ is an oxen atom or NH, $X^2$ is an oxygen atom, p is the number of 1 to 8, and $R^9$ is a hydrogen atom, a methyl group, or an ethyl group.

Structural Unit A

The structural unit A is a component that is contained in the component B and is adsorbed on carbon surfaces. In the general formula (1), $R^1$ and $R^2$ are each preferably a hydrogen atom, and $R^3$ is preferably a hydrogen atom or a methyl group and more preferably a methyl group, from the viewpoints of improving the dispersibility of CNTs and ease of introduction of the structural unit A into the component B.

In the general formula (1), $R^4$ is preferably an alkyl group or an alkenyl group from the viewpoint of improving the dispersibility of CNTs, and the number of carbon atoms in $R^4$ is preferably 16 or more from the same viewpoint and is 30 or less, preferably 26 or less, more preferably 22 or less, still more preferably 20 or less, and even more preferably 18 or less, from the same viewpoint. Specifically, the number of carbon atoms in $R^4$ is 16 to 30, preferably 16 to 26, more preferably 16 to 22, still more preferably 16 to 20, and even inure preferably 16 to 18. More specifically, examples of $R^4$ include a palmityl group, a stearyl group, an oleyl group, and a behenyl group.

In the general formula (1), $X^1$ is preferably an oxygen atom from the viewpoint of ease of introduction of the structural unit A into the component B.

The structural unit A represented by the general formula (1) is preferably a structural unit $a^1$ in which $X^1$ is an oxygen atom and $R^4$ has 16 to 20 carbon atoms, from the viewpoint of improving the dispersibility of CNTs.

In synthesis of the component B, specific examples of a monomer that provides the structural unit A (also referred to as "monomer A" hereinafter) include: ester compounds such as palmityl (meth)acrylate, stearyl (meth)acrylate, isostearyl (meth)acrylate, and behenyl (meth)acrylate; and amide compounds such as palmityl (meth)acrylamide, stearyl (meth) acrylamide, and behenyl (meth)acrylamide. Of these, the monomer A is preferably at least one selected from palmityl (meth)acrylate, stearyl (meth)acrylate, and behenyl (meth) acrylate, more preferably at least one selected from palmityl (meth)acrylate and stearyl (meth)acrylate, still more preferably at least one selected from stearyl (meth)acrylate, and even more preferably stearyl methacrylate (also referred to as "SMA" hereinafter), from the viewpoints of improving the dispersibility of CNTs and ease of introduction of the structural unit A into the component B.

The content of the structural unit A in all structural units of the component B is preferably 20 mass % or more, more preferably 30 mass % or more, still more preferably 35 mass % or more, and even more preferably 40 mass % or more, from the viewpoints of improving the dispersibility of CNTs and reducing the resistance of a positive electrode coating, and is preferably 80 mass % or less, more preferably 70 mass % or less, and still more preferably 65 mass % or less, from the same viewpoint. Specifically, the content of the structural unit A in all structural units of the component B is preferably 20 mass % or more and 80 mass % or less, more preferably 30 mass % or more and 80 mass % or less, still more preferably 35 mass % or more and 70 mass % or less, and even more preferably 40 mass % or more and 65 mass % or less. In the present disclosure, the content of the structural unit A in all structural units of the component B can be regarded as the proportion of the amount of the monomer A used in the total amount of monomers used for polymerization.

Structural Unit B

The structural unit B is a component that is contained in the component B and dissolves in the component C. In the general formula (2), $R^5$ and $R^6$ are each preferably a hydrogen atom, $R^7$ is preferably a hydrogen atom or a methyl group, more preferably a methyl group, and $R^9$ is preferably a hydrogen atom or a methyl group and more preferably a hydrogen atom, from the viewpoints of improving the dispersibility of CNTs, improving the solubility in a solvent, and ease of introduction of the structural unit B into the component B. From the same viewpoint, $R^8$ is preferably an ethylene group or a propylene group and more preferably an ethylene group.

In the general formula (2), p is preferably 1 or more from the viewpoints of improving the dispersibility of CNTs and ease of introduction of the structural unit B into the component B, and is preferably 4 or less, more preferably 3 or less, and still more preferably 2 or less, from the same viewpoint. Specifically, p is preferably 1 to 4, more preferably 1 to 3, and still more preferably 1 to 2.

In the general formula (2), $X^2$ is preferably an oxygen atom from the viewpoint of ease of introduction of the structural unit B into the component B.

The content of the structural unit B in all structural units of the component B is preferably 20 mass % or more and more preferably 25 mass % or more, from the viewpoints of improving the dispersibility of CNTs and reducing the resistance of a positive electrode coating, and is preferably 80 mass % or less, more preferably 75 mass % or less, still more preferably 70 mass, or less, even more preferably 65 mass % or less, and yet more preferably 60 mass % or less, from the same viewpoint. The proportion of the structural unit B in the component B is preferably 20 mass % or more and 80 mass % or less, more preferably 20 mass % or more and 75 mass % or less, still more preferably 20 mass % or more and 70 mass % or less, even more preferably 20 mass % or more and 65 mass % or less, yet more preferably 20 mass % or more and 60 mass % or less, and yet more preferably 25 mass % or more and 60 mass % or less. In the present disclosure, the content of the structural unit B in all structural units of the component B can be regarded as the proportion of the amount of the monomer B used in the total amount of monomers used for polymerization.

The mass ratio between the structural unit A and the structural unit B (the structural unit B/the structural unit A) in the component B is preferably 0.08 or more, more preferably 0.2 or more, still more preferably 0.3 or more, even more preferably 0.4 or more, and yet more preferably 0.5 or more, from the viewpoints of improving the dispersibility of CNTs and reducing the resistance of a positive electrode coating, and is preferably 2.5 or less, more preferably 1.9 or less, still more preferably 1.5 or less, and even more preferably 1.3 or less, from the same viewpoint. Specifically, the mass ratio (the structural unit B/the structural unit A) is preferably 0.08 or more and 2.5 or less, more preferably 0.2 or more and 1.9 or less, still more preferably 0.3 or more and 1.9 or less, even more preferably 0.3 or more and 1.5 or less, yet more preferably 0.4 or more and 1.5 or less, yet more preferably 0.5 or more and 1.5 or less, and yet more preferably 0.5 or more and 1.3 or less. In the present disclosure, the mass ratio (the structural unit B/the structural unit A) can be regarded as the macs ratio of the monomer B to the monomer A used for polymerization of the component B.

From the viewpoint of improving the dispersability of CNTs, in the structural unit B represented by the general formula (2), a structural unit $b^1$ in which $X^2$ is an oxygen atom, p is 1, and $R^9$ is a hydrogen atom preferably accounts for 50 mass % or more of the total amount of the structural unit B represented by the general formula (2).

When the structural unit B represented by the general formula (2) consists of one type of structural unit, the structural unit B is preferably the above-described structural unit $b^1$ from the viewpoints of improving the dispersibility of CNTs and reducing the resistance of a positive electrode coating.

When the structural unit B represented by the general formula (2) includes two or more types of structural units, the structural unit B preferably includes both the above-described structural unit $b^3$ and a structural unit $b^4$, which is at least one selected from a structural unit $b^2$ in which $X^2$ is an oxygen atom, p is 1, and $R^9$ is a methyl group and a structural unit $b^3$ in which $X^2$ is an oxygen atom, p is 1, and $R^9$ is a methyl group, more preferably includes both the structural unit $b^1$ and the structural unit $b^3$, and still more preferably consists of the structural unit $b^1$ and the structural unit $b^3$, from the viewpoint of improving the dispersibility of CNTs and reducing the resistance of a positive electrode coating. The mass ratio between the structural unit $b^1$ and the structural unit $b^1$ (the structural unit $b^1$/the structural unit $b^4$) is preferably 0.5 or more, more preferably 0.8 or more, and still more preferably 1.0 or more, from the viewpoints of improving the dispersibility of CNTs and reducing the resistance of a positive electrode coating, and is preferably 2.0 or less, more preferably 1.5 or less, and still more preferably 1.2 or less, from the same viewpoint.

The structural unit B may have, for example, a structure derived from a nonionic monomer or a structure obtained by introducing a nonionic group after polymerization. In synthesis of the component B, specific examples of a monomer that provides the structural unit B (also referred to as "monomer B" hereinafter) include: 2-hydroxyethyl methacrylate, methoxyethyl methacrylate, methoxy polyethylene glycol (meth)acrylate, methoxy polyethylene glycol/propylene glycol) mono(meth)acrylate, ethoxy poly(ethylene glycol/propylene glycol) mono(meth)acrylate, polyethylene glycol mono(meth)acrylate, and polypropylene glycol mono (meth)acrylate. Of these, from the viewpoints of improving the dispersibility of CNTs and ease of introduction of the structural unit B into the component B, the monomer B is preferably at least one selected from 2-hydroxyethyl methacrylate, methoxyethyl methacrylate, and methoxy polyethylene glycol (meth)acrylate (the average number of moles of ethylene oxide added=2), more preferably at least one selected from 2-hydroxyethyl methacrylate (also referred to as "HEMA" hereinafter), methoxyethyl methacrylate (also referred to as "PEGMA (EO1)" hereinafter), and methoxy polyethylene glycol methacrylate (the average number of moles of ethylene oxide added=2) (also referred to as "PEGMA (EO2)" hereinafter).

Structural Unit C

The component B may contain at least one structural unit C selected from structural units represented by the following general formula (3), structural units derived from acrylic acid monomers, structural units derived from (meth)acrylic acid esters having 1 to 15 carbon atoms, and structural units derived from (meth)acrylamides.

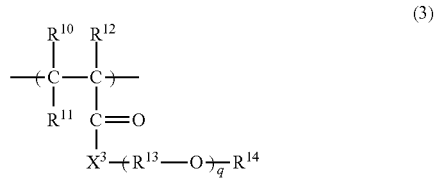

(3)

In the above formula, $R^{10}$, $R^{11}$, $R^{12}$, and $R^{14}$ are the same or different from each other and are each a hydrogen atom, a methyl group, or an ethyl group, $R^{13}$ is a linear or branched alkylene group having 2 to 4 carbon atoms, $X^3$ is an oxygen atom, and q is the number of 9 to 50.

From the viewpoints of improving the dispersibility of CNTs and reducing the resistance of a positive electrode coating, the component B preferably contains at least one structural unit C selected from structural units represented by the general formula (3), structural units derived from acrylic acid monomers, and structural units derived from (meth)acrylamides, more preferably contains at least one structural unit C selected from structural units represented by the general formula (3) and structural units derived from (meth)acrylamides, and still more preferably contains a structural unit represented by the general formula (3).

In the above general formula (3), $R^{10}$ and $R^{11}$ are each preferably a hydrogen atom, and $R^{12}$ is preferably a hydrogen atom or a methyl group and more preferably a methyl group, from the viewpoint of improving the dispersibility of the CNTs. From the same viewpoint, $R^{13}$ is preferably an ethylene group or a propylene group and more preferably an ethylene group. From the same viewpoint, $R^{14}$ is preferably a hydrogen atom or a methyl group and more preferably a methyl group.

In the general formula (3), q is preferably 12 or less, more preferably 11 or less, and still more preferably 10 or less, from the viewpoint of improving the dispersibility of CNTs.

Specifically, q is preferably 9 to 12, more preferably 9 to 11, and still more preferably 9 to 10.

Specifically, the structural unit C represented by the general formula (3) is preferably a structural unit c1 in which $R^{10}$ and $R^{11}$ are each a hydrogen atom, $R^{12}$ is a hydrogen atom or a methyl group, q is 9 to 10, and $R^{14}$ is a hydrogen atom or a methyl group, and more preferably a structural unit $c^1$ in which q is 9 and $R^{14}$ is a methyl group, from the viewpoint of improving the dispersibility of CNTs and ease of introduction of the structural unit C into the component B.

Examples of the structural units derived from acrylic acid monomers include structural units derived from one or more monomers selected from acrylic acid, methacrylic acid, maleic acid, and itaconic acid. From the viewpoints of improving the dispersibility of CNTs and ease of introduction of the structural unit C into the component B, the structural unit C is preferably a structural unit $c^2$ derived from one or more monomers selected from acrylic acid and methacrylic acid.

Examples of the structural units derived from (meth)acrylic acid esters having 1 to 15 carbon atoms include alkyl or alkenyl esters having 1 to 15 carbon atoms, aryl esters having 6 to 15 carbon atoms, and aralkyl esters having 7 to 15 carbon atoms. Specific examples thereof include structural units derived from methyl (meth)acrylate, ethyl (meth)acrylate, propyl (meth)acrylate, butyl (meth)acrylate, 2-ethylhexyl (meth)acrylate, decyl (meth)acrylate, dodecyl (meth)acrylate, lauryl (meth)acrylate, myristyl (meth)acrylate, phenyl (meth)acrylate, and benzyl (meth)acrylate. From the viewpoints of improving the dispersibility of CNTs and ease of introduction of the structural unit C into the component B, structural units derived from at least one monomer selected from 2-ethylhexyl (meth)acrylate, decyl (meth)acrylate, dodecyl (meth)acrylate, lauryl (meth)acrylate, and myristyl (meth)acrylate are preferable.

Examples of the structural units derived from (meth)acrylamides include structural units derived from acrylamide, methacrylamide, dimethylacrylamide, dimethylmethacrylamide, dimethylaminopropyl acrylamide, N-methylolacrylamide, and N-isopropylacrylamide. From the viewpoints of improving the dispersibility of CNTs and ease of introduction of the structural unit C into the component B, structural units derived from at least one monomer selected from acrylamide, methyacrylamide, dimethylacrylamide, and dimethylmethacrylamide are preferable, and a structural unit $c^3$ derived from dimethylacrylamide (also referred to as "DMAAm" hereinafter) and a structural unit $c^4$ derived from methacrylamide (also referred to as "MAAm" hereinafter) are more preferable.

In one or more embodiments, from the viewpoints of improving the dispersibility of CNTs and reducing the resistance of a positive electrode coating, the structural unit C is preferably at least one structural unit selected from structural units represented by the general formula (3) where $X^3$ is an oxygen atom, q is 9 to 10, $R^{10}$ and $R^{11}$ are each a hydrogen atom, $R^{12}$ is a hydrogen atom or a methyl group, $R^{13}$ is an ethylene group, and $R^{14}$ is a methyl group, structural units derived from at least one monomer selected from acrylic acid and methacrylic acid, and structural units derived from at least one monomer selected from acrylamide, methacrylamide, dimethylacrylamide, and dimethylmethacrylamide.

From the viewpoints of improving the dispersibility of CNTS and reducing the resistance of a positive electrode coating, the component B preferably contains the structural unit $a^1$, the structural unit $b^1$, and at least one structural unit selected from the structural units $c^1$, $c^2$, $c^3$, and $c^1$, more preferably the structural unit $a^1$, the structural unit $b^1$, and at least one structural unit selected from the structural units $c^1$, $c^3$, and $c^4$, still more preferably the structural unit $a^1$, the structural unit $b^1$, and at least one structural unit selected from the structural units $c^1$ and $c^4$, and even more preferably the structural unit $a^1$, the structural unit $b^1$, and the structural unit $c^1$.

The total content of the structural unit A and the structural unit B in all structural units of the component B is preferably 100 mass % from the viewpoint of improving the dispersibility of CNTs and reducing the resistance of a positive electrode coating. When the component B includes the structural unit C, the total content of the structural unit A and the structural unit B in all structural units of the component B is preferably 50 mass % or more, more preferably 60 mass % or more, and still more preferably 70 mass % or more, from the viewpoints of improving the dispersibility of CNTs and reducing the resistance of a positive electrode coating, and is preferably less than 100 mass %, more preferably 95 mass % or less, and still more preferably 90 mass % or less, from the same viewpoint. Specifically, when the component B includes the structural unit C, the total content of the structural unit A and the structural unit B in all structural units of the component B is preferably 50 mass % or more and less than 100 mass %, more preferably 60 mass % or more and 95 mass % or less, and still more preferably 70 mass % or more and 90 mass % or less.

The content of the structural unit C in all structural units of the component B is preferably more than 0 mass %, more preferably 1 mass % or more, still more preferably 5 mass % or more, even more preferably 8 mass % or more, and yet more preferably 10 mass % or more, from the viewpoints of improving the dispersibility of CNTs and reducing the resistance of a positive electrode coating, and is preferably 40 mass % or less, more preferably 35 mass % or less, and still more preferably 30 mass % or less, from the same viewpoint. Specifically, the content of the structural unit C in all structural units of the component B is preferably 5 mass % or more and 40 mass % or less, more preferably 8 mass % or more and 35 mass % or less, and still more preferably 10 mass % or more and 30 mass % or less. In the present disclosure, the content of the structural unit C in all structural units of the component B can be regarded as the proportion of the amount of a monomer C used in the total amount of monomers used for polymerization.

The component B is preferably at least one selected from the following copolymers from the viewpoints of improving the dispersibility of CNTs and reducing the resistance of a positive electrode coating.

Copolymer of SMA and HEMA
Copolymer of SMA, PEGMA (EO1), and HEMA
Copolymer of SMA, PEGMA (EO1), and MAA
Copolymer of SMA, PEGMA (EO1), and MAAm
Copolymer of SMA, HEMA, and MAA
Copolymer of SMA, HEMA, and MAAm
Copolymer of SMA, HEMA, and DMAAm
Copolymer of SMA, (EO1), and PEGMA (EO9)
Copolymer of SMA, HEMA, and PEGMA (EO9)
Copolymer of SMA, PEGMA (EO1), MAA, and PEGMA (EO9)
Copolymer of SMA, PEGMA (EO1), MAAm, and PEGMA (EO9)
Copolymer of SMA, HEMA, MAA, and PEGMA (EO9)
Copolymer of SMA, HEMA, MAAm, and PEGMA (EO9)
Copolymer of SMA, PEGMA (EO1), and PEGMA (EO9)
Copolymer of SMA, HEMA, and PEGMA (EO9)
Copolymer of SMA, HEMA, and PEGMA (EO2)

Copolymer of SMA, MAA, and PEGMA (EO2)
Copolymer of SMA, MAAm, and PEGMA (EO2)
Copolymer of SMA, PEGMA (EO1), MAA, and PEGMA (EO2)
Copolymer of SMA, PEGMA (EO1), MAAm, and PEGMA (EO2)
Copolymer of SMA, HEMA, MAA, and PEGMA (EO2)
Copolymer of SMA, HEMA, MAAm, and PEGMA (EO2)
Copolymer of SMA and PEGMA (EO2)

Of these copolymers, at least one selected from the copolymer of SMA and HEMA, the copolymer of SMA, PEGMA (EO1), and HEMA, the copolymer of SMA, HEMA, and MAA, the copolymer of SMA, HEMA, and MAAm, the copolymer of SMA, HEMA, and DMAAm, the copolymer of SMA, HEMA, and PEGMA (EO9), the copolymer of SMA, HEMA, and PEGMA (EO2), and the copolymer of SMA, MAAm, and PEGMA (EO2) is more preferable, and at least one selected from the copolymer of SMA, HEMA, and PEGMA (EO9) and the copolymer of SMA, HEMA, and PEGMA (EO2) is still more preferable, from the viewpoint of improving the dispersibility of CNTs and reducing the resistance of a positive electrode coating.

The content of the component B in the CNT dispersant composition or conductive material dispersion of the present invention is preferably 0.1 mass % or more, more preferably 0.2 mass %, and still more preferably 0.5 mass % or more, from the viewpoint of improving the dispersibility of the CNTs or the conductive material, and is preferably 10 mass % or less, more preferably 5 mass % or less, and still more preferably 2 mass % or less, from the viewpoint of reducing the resistance of a positive electrode coating. Specifically, the content of the component B in the CNT dispersant composition or conductive material dispersion of the present invention is preferably 0.1 to 10 mass %, more preferably 0.2 to 5 mass %, and still more preferably 0.5 to 2 mass %.

The mass ratio between the component B and the component A (the component B/the component A) in the CNT dispersant composition or conductive material dispersion of the present invention is preferably 0.05 or more, more preferably 0.1 or more, and still more preferably 0.15 or more, from the viewpoint of improving the dispersibility of CNTs, and is preferably 1 or less, more preferably 0.7 or less, and still more preferably 0.5 or less, from the viewpoint of reducing the resistance of a positive electrode coating. Specifically, the mass ratio (the component B/the component A) is preferably 0.05 or more and 1 or less, more preferably 0.1 or more and 0.7 or less, and still more preferably 0.15 or more and 0.5 or leas.

The method fear synthesizing the component B is not limited to particular methods, and ordinary methods used for polymerization of (meth)acrylic acid esters can be used. Examples of such methods include free radical polymerization, living radical polymerization, anionic polymerization, and living anionic polymerization. For example, in the case of free radical polymerization, the component B can be obtained using a known method such as polymerizing monomer components including the monomer A and the monomer B through solution polymerization.

Examples of a solvent used for solution polymerization include organic solvents such as hydrocarbons (hexane, heptane), aromatic hydrocarbons (toluene, xylene, and the like), lower alcohols (ethanol, isopropanol, and the like), ketones (acetone, methyl ethyl ketone), ethers (tetrahydrofuran, diethylene glycol dimethyl ether), and N-methyl-2-pyrrolidone. From the viewpoint of use as a conductive material of positive electrodes for batteries, N-methyl-2-pyrrolidone is preferable. The amount of the solvent is preferably 0.5 to 5 times the total amount of monomers in terms of mass ratio.

A polymerization initiator to be used may be a known radical polymerization initiator, examples of which include azo polymerization initiators, hydroperoxides, dialkyl peroxides, diacyl peroxides, and ketone peroxides. The amount of the polymerization initiator is preferably 0.01 to 7 mol %, more preferably 0.01 to 5 mol %, and particularly preferably 0.01 to 3 mol %, with respect to the total amount of monomer components. The polymerization reaction is preferably carried out in a nitrogen stream in a temperature range from 60° C. to 180° C., and the reaction time is preferably 0.5 to 20 hours.

Also, known chain transfer agents for adjusting the molecular weight can be used. Examples thereof include isopropyl alcohol and mercapto compounds such as mercaptoethanol. In the copolymer (component B), the arrangement of the structural unit A and the structural unit B may be one that yields either a random, block, or graft copolymer. The copolymer (component B) may further include a structural unit(s) other than these structural units.

The weight-average molecular weight of the component B is preferably 5,000 or more, more preferably 10,000 or more, and still more preferably 20,000 or more, from the viewpoint of improving the dispersibility of CNTs, and is preferably 200,000 or less, more preferably 100,000 or less, and still more preferably 80,000 or less, from the same viewpoint. Specifically, the weight-average molecular weight of the component B is preferably 5,000 to 200,000, more preferably 10,000 to 100,000, and still more preferably 20,000 to 80,000. The weight-avenge molecular weight is a value measured using gel permeation chromatography (GPC), and the details of measurement conditions are as described in the "Examples" section.

Solvent (Component C)

The solvent contained in the CNT dispersant composition or conductive material dispersion according to the present invention is an organic solvent, which is preferably one in which a binder contained in a positive electrode paste for batteries can dissolve.

For example, when the binder is PVDF (polyvinylidene fluoride resin), which is contained in conventional positive electrode pastes for batteries, N-methyl-2-pyrrolidone (NMP) is typically used as the solvent (component C). From the viewpoint of improving the dispersibility of CNTs, the solvent (component C) is preferably N-methyl-2-pyrrolidone.

The content of the solvent in the CNT dispersant composition of the present invention may be the remainder excluding the component B and an optional component(s) to be described below, which is added when necessary.

The content of the solvent in the conductive material dispersion of the present invention may be the remainder excluding the component A, the component B, and an optional component(s) to be described below, which is added when necessary.

The content of the component B in the CNT dispersant composition or conductive material dispersion of the present invention is preferably 80 mass % or more, more preferably 87 mass % or more, and still more preferably 91 mass % or more, from the viewpoints of improving the dispersibility of a conductive material and providing the viscosity that allows the dispersion to be handled easily, and is preferably less than 99 mass %, more preferably 97.8 mass % or less, and still more preferably 96.5 mass % or less, from the viewpoint of improving the convenience of adjusting the concentration of a positive electrode paste.

Other Optional Components

The CNT dispersant composition or conductive material dispersion of the present invention may contain the following optional component(s) to the extent that the effects of the present invention are not impaired. The optional component may be, for example, at least one selected from surfactants, thickening tints, antifoaming agents, inorganic salts, organic salts, and neutralizers.

The viscosity of the conductive material dispersion as measured at 25° C. and at a shear rate of 1(1/S) is preferably as low as possible. However, when the CNT content is 5 mass % from a practical standpoint, the viscosity is, for example, preferably 10 Pa·s or more, more preferably 50 Pa·s or more, and still more preferably 100 Pa·s or more. When the CNT content is 5 mass %, the viscosity of the conductive material dispersion at 25° C. is preferably 1000 Pa·s or less, more preferably 800 Pa·s or less, still more preferably 500 Pa·s or less, and even more preferably 300 Pa·s or less, from the viewpoint of improving the handleability of the conductive material dispersion at the time of preparing a positive electrode paste. The viscosity can be measured by, for example, the method described in the "Examples" section.

The particle size of CNTs as determined by a dynamic light scattering method is preferably 100 nm or more, more preferably 130 nm or more, and still more preferably 150 nm or more, from the viewpoint of improving the conductivity, and is preferably 1000 nm or less, more preferably 500 nm or less, and still more preferably 300 nm or less, from the same viewpoint. The particle size can be measured by, for example, the method described in the "Examples" section.

Method for Producing CNT Dispersant Composition

The CNT dispersant composition of the present invention can be produced by, for example, adding the component C and, when necessary, an optional component(s) to the component B and mixing them together. The component B to which the component C is added may be in the form of a solution of the component B. A solvent in the solution of the component B is preferably the same as the component C.

Method for Producing Conductive Material Dispersion

The conductive material dispersion of the present invention can be produced by, for example, blending the component A, the component B, the component C, and when necessary, an optional component(s) using a commonly-known technique and then dispersing the CNTs in the solvent using a dispersion mixer or the like. Some of the components of the conductive material dispersion may be mixed first and then the resultant mixture may be mixed with the remainder. Also, each component need not necessarily be added in the whole amount at once, and may be divided into two or more portions and added separately. Alternatively, a CNT dispersant composition containing the component B, the component C, and, when necessary, the optional component(s) may be prepared, and then CNTS may be mixed with the CNT dispersant composition.

The dispersion mixer may be, for example, at least one selected from an ultrasonic homogenizer, a vibration mill, a jet mill, a ball mill, a bead mill, a sand mill, a roll mill, a homogenizer, a high-pressure homogenizer, an ultrasonic device, an attritor, a dissolver, and a paint shaker. CNTs are preferably dispersed using a high-pressure homogenizer from the viewpoint of improving the dispersibility. CNTs to be used for preparation of a CNT dispersion may be in a dry state or may contain a solvent. The solvent is preferably the same as the component C.

Positive Electrode Paste

The positive electrode paste according to the present invention is prepared by mixing a positive electrode active material, the conductive material dispersion of the present invention, a binder, a solvent for, e.g., adjusting the solid content, and the like, and then stirring the resultant mixture. In addition to these components, dispersants, functional materials, and the like may be further added. The solvent may be a non-aqueous solvent such as N-methyl-2-pyrrolidone (NMP), dimethylformamide (DMF), or dimethyl sulfoxide (DMSO), or alternatively, water or the like. In the positive electrode paste of the present invention, a non-aqueous solvent is preferably used, and in particular, NMP is more preferably used. Mixing and stirring can be performed using a planetary mixer, a bead mill, a jet mill, or the like. Also, they ma be used in any desired combination. The amount of the solvent used in the positive electrode paste according to the present invention is preferably 10 to 35 parts by mass and more preferably 15 to 30 parts by mass, with respect to 100 parts by mass of the total solid content of the positive electrode paste.

The materials may be added while rotating stirring blades. This can reduce the mechanical load on the stirring device, can reduce the bulk of the materials in the stirring container, and can perform preliminary mixing of the respective materials. Each material need not necessarily be added in the whole amount at once, and may be divided into two or more portions and added separately. This can reduce the mechanical load on the stirring device.

Positive Electrode Active Material

The positive electrode active material is not limited to particular materials as long as it is an inorganic compound. For example, a compound with an olivine structure or a lithium transition metal complex oxide can be used as the positive electrode active material. Examples of the compound with an olivine structure include compounds represented by the general formula $Li_xM1_sPO_4$ (where M1 is a 3d transition metal, $0 \leq x \leq 2$, and $0.8 \leq s \leq 1.2$). The compound with an olivine structure may be coated with amorphous carbon or the like. Examples of the lithium transition metal complex oxide include lithium manganese oxides with a spinel structure and lithium transition metal complex oxides having a layered structure and represented by the general formula $Li_xMO_{2\delta}$ (where M is a transition metal, $0.4 \leq x \leq 1.2$, and $0 \leq \delta \leq 0.5$). Co, Ni, or Mn may be contained as the transition metal M. The lithium transition metal complex oxide may further contain one element or two or more elements elected from Al, Mn, Fe, Ni, Co, Cr, Ti, Zn, P, and B.

The content of the positive electrode active material in the total solid content of the positive electrode paste is not limited to particular values, and may be the same as those in the total solid contents of conventionally known positive electrode pastes. Specifically, it is preferably 90 to 99.5 mass %.

Conductive Material

In addition to CNTs contained in the conductive material dispersion of the present invention, various types of carbon materials other than CNTs also can be used as conductive materials. The positive electrode paste of the present invention thus may further contain a conductive material(s) other than CNTs. As the conductive material other than CNTs, carbon black of various pes such as acetylene black, furnace black, and Ketjen Black, and carbon-based conductive materials such as graphite can be used. Conductive polymers other than carbon-based conductive polymers, such as polyaniline, also may be used.

The content of CNTs in the total solid content of the positive electrode paste is preferably 0.05 to 2.0 mass %.

Binder

As the binder, polyvinylidene fluoride (PVDF), vinylidene fluoride-hexafluoropropylene copolymer, styrene-butadiene rubber, polyacrylonitrile, and the like can be used alone, or two or more of them may be used in the form of a mixture.

The content of the binder in the total solid content of the positive electrode paste is preferably 0.2 to 4 mass %.

Positive Electrode

A positive electrode is produced by applying the above-described positive electrode paste onto a current collector format of an aluminum foil or the like and then drying it. In order to increase the density of the positive electrode, the positive electrode may be subjected to consolidation using a press machine. The positive electrode paste may be applied using a die head, a comma reverse roll, a direct roll, a gravure roll, or the like. Drying after the application can be performed using heating, airflow, infrared irradiation, and the like either alone or in any desired combination. The positive electrode can be pressed using a roll press machine or the like.

Regarding the embodiments described above, the present invention further discloses the following conductive material dispersion and positive electrode paste for batteries.

<1> A conductive material dispersion including:
  carbon nanotubes;
  a copolymer that includes a structural unit A represented by the following general formula (1) and a structural unit B represented by the following general formula (2); and
  a solvent,
  wherein the content of the structural unit B all structural units of the copolymer is 20 mass % or more:

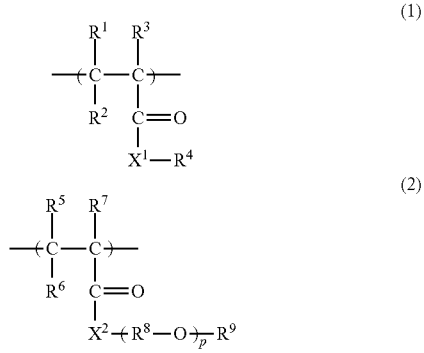

where $R^1$, $R^2$, $R^3$, $R^5$, $R^6$, and $R^7$ are the same or different from each other and are each a hydrogen atom, a methyl group, or an ethyl group; $R^4$ is a hydrocarbon group having 16 to 30 carbon atoms, $R^8$ is a linear or branched alkylene group having 2 to 3 carbon atoms. $X^1$ is an oxygen atom or NH, $X^2$ is an oxygen atom, p is the number of 1 to 8, and $R^9$ is a hydrogen atom, a methyl group, or an ethyl group.

<2> The conductive material dispersion according to <1>, including:
  carbon nanotubes;
  a copolymer that includes a structural unit A represented by the following general formula (1) and a structural unit B represented by the following general formula (2); and
  a solvent,
  wherein, in all the structural units of the copolymer, the content of the structural unit B is 20 mass % or more and 80 mass % or less, the content of the structural unit A is 20 mass % or more and 80 mass % or less, and the total content of the structural unit A and the structural unit B is 50 mass % or more:

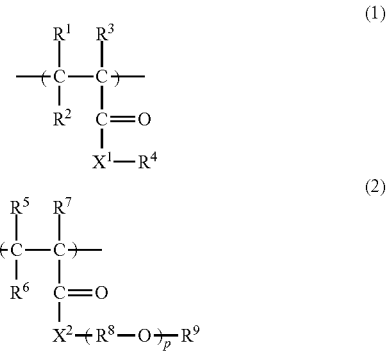

where $R^1$, $R^2$, $R^5$, and $R^6$ are each a hydrogen atom, $R^3$, $R^7$, and $R^9$ are the same or different from each other and are each a hydrogen atom or a methyl group, $R^4$ is a hydrocarbon group having 16 to 22 carbon atoms, $R^8$ is a linear or branched alkylene group having 2 to 3 carbon atoms, $X^1$ and $X^2$ are each an oxygen atom, and p is the number of 1 to 4.

<3> The conductive material dispersion according to <1>, including:
  carbon nanotubes;
  a copolymer that includes a structural unit A represented by the following general formula (1) and a structural unit B represented by the following general formula (2); and
  a solvent,
  wherein, in all the structural units of the copolymer, the content of the structural unit B is 20 mass % or more and 80 mass % or less, the content of the structural unit A is 20 mass % or more and 80 mass % or less, and the total content of the structural unit A and the structural unit B is 50 mass % or more, and
  the ratio of the content of the structural unit B to the content of the structural unit A (the structural unit B/the structural unit A) in the copolymer is 0.3 or more and 1.9 or less:

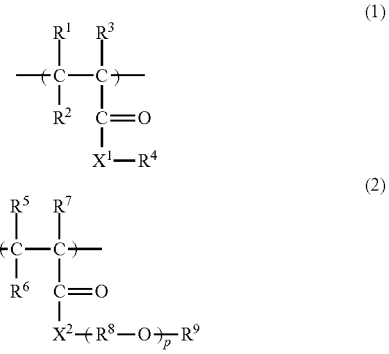

where $R^1$, $R^2$, $R^5$, and $R^6$ are each a hydrogen atom, $R^3$, $R^7$, and $R^9$ are the same or different from each other and are each a hydrogen atom or a methyl group, $R^4$ is a hydrocarbon group having 16 to 22 carbon atoms, R⁸ is an ethylene group, X¹ and X² are each an oxygen atom, and p is the number of 1 to 4.

<4> The conductive material dispersion according to <1>, including:

carbon nanotubes;

a copolymer that includes a structural unit A represented by the following general formula (1) and a structural unit B represented by the following general formula (2); and a solvent, wherein, in all the structural units of the copolymer, the content of the structural unit B is 20 mass % or more and 80 mass % or less, the content of the structural unit A is 30 mass % or more and 80 mass % or less, and the total content of the structural unit A and the structural unit B is 60 mass % or more, and the ratio of the content of the structural unit B to the content of the structural unit A (the structural unit B/the structural unit A) in the copolymer is 0.5 or more and 1.5 or less:

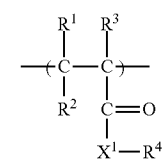

(1)

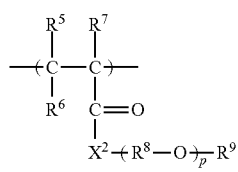

(2)

where $R^1$, $R^2$, $R^5$, and $R^6$ are each a hydrogen atom, $R^3$, $R^7$, and $R^9$ are the same or different from each other and are each a hydrogen atom or a methyl group, $R^4$ is a hydrocarbon group having 16 to 22 carbon atoms, $R^8$ is an ethylene group, $X^1$ and $X^2$ are each an oxygen atom, and p is the number of 1 to 4.

<5> The conductive material dispersion according to any one of <1> to <4>, wherein the copolymer further includes at least one structural unit C selected from structural units represented by the following general formula (3), structural units derived from acrylic acid monomers, structural units derived from (meth) acrylic acid esters having 1 to 15 carbon atoms, and structural units derived from (meth)acrylamides:

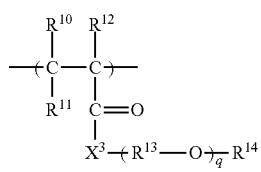

(3)

where $R^{10}$ and $R^{11}$ are each a hydrogen atom, $R^{12}$ and $R^{14}$ are the same or different from each other and are each a hydrogen atom or a methyl group, $R^{13}$ is an ethylene group, $X^3$ is an oxygen atom, and q is the number of 9 to 12.

<6> The conductive material dispersion according to any one of <1> to <5>, wherein the copolymer further includes at least one structural unit C selected from structural units represented by the following general formula (3), structural units derived from at least one monomer selected from acrylic acid and methacrylic acid, and structural units derived from at least one monomer selected from acrylamide, methacrylamide, dimethylacrylamide, and dimethylmethacrylamide:

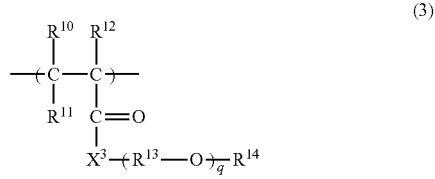

(3)

where $R^{10}$ and $R^{11}$ are each a hydrogen atom, $R^{12}$ is a methyl group, $R^{14}$ as a methyl group, $R^{13}$ is an ethylene group, $X^3$ is an oxygen atom, and q is the number of 9 to 10.

<7> The conductive material dispersion according to any one of <1> to <6>, wherein the copolymer has a weight-average molecular weight of 10,000 or more and 100,000 or less.

<8> The conductive material dispersion according to any one of <1> to <7>, wherein the content of the carbon nanotubes is 1 mass % or more.

<9> The conductive material dispersion according to any one of <1> to <8>, wherein the mass ratio between the copolymer and the carbon nanotubes (the copolymer/the carbon nanotubes) is 0.05 or more and 1 or less.

<10> The conductive material dispersion according to any one of <1> to <9>, wherein the solvent is N-methyl-2-pyrrolidone.

<11> A positive electrode paste fix a battery, including:

the conductive material dispersion according to any one of <1> to <10>;

a positive electrode active material; and a binder.

EXAMPLES

Examples and comparative examples of the present invention will be described below. It is to be noted, however, that the present invention is not limited thereto.

Measurement of Viscosity

The viscosity of a CNT dispersion (25° C.) with the CNT content of 5 mass % was measured at a shear rate ranging from 0.1 to 1000 (1/s) using a MCR302 rheometer (manufactured by Anton Paar) with parallel plates PP50 set therein. The viscosity at the shear rate of 1 (1/s) was recorded and shown in Table 3.

Measurement of Particle Size

A CNT dispersion with the CNT content of 5 mass % was diluted 500-fold with N-methyl-2-pyrrolidone and then poured into a glass cell. The cell was set in a ZETASIZER Nano-S manufactured by Malvern Panalytical, and the particle size of the CNTs was measured at 20° C. The results are shown in Table 3.

Measurement of Nonvolatile Content

The nonvolatile content of a copolymer solution was measured in the following manner.

10 g of dry anhydrous sodium sulfate and a glass rod were placed in a petri dish, and the total mass of the petri dish including its contents was measured. The measured value is referred to as W3 (g). 2 g of a NMP solution of a copolymer was further added to the petri dish as a sample, and the total mass of the petri dish including its contents was measured. The measured value is referred to as W1 (g). The dry anhydrous sodium sulfate and the sample were mixed together using the above-described glass rod in the petri dish. With the mixture of the dry anhydrous sodium sulfate and the sample obtained by mixing them with the glass rod and the glass rod being left in the petri dish, the whole petri dish was dried in a vacuum dryer (in a nitrogen stream and a pressure of 40 kPa) at 140° C. for 12 hours. The total mass of the petri dish including its contents after the drying was measured. The measured value is referred to as W2 (g). The value calculated as per the following equation was regarded as the nonvolatile content.

Nonvolatile Content (mass %)=100−($W1$−$W2$)/($W1$−$W3$)×100

Measurement of Weight-Average Molecular Weight of Copolymer

The weight-average molecular weight of a copolymer was measured by GPC.
The detailed conditions of the GPC were as follows.
Measurement device: HLC-8320GPC (Tosoh Corporation)
Columns: α-M+α-M (Tosoh Corporation)
Column temperature: 40° C.
Detector: differential refractive index
Eluent: N,N-dimethylformamide (DMF) solution containing 60 mmol/L $H_3PO_4$ and 50 mmol/L LiBr
Flow rate: 1 mL/min
Standard samples for calibration curve: monodisperse polystyrenes $5.26×10^2$, $1.02×10^5$, and $8.42×10^6$, manufactured by Tosoh Corporation; and monodisperse polystyrenes $4.0×10^3$, $3.0×10^4$, and $9.0×10^5$, manufactured by Nishio K.K. (the FIGURES indicate the molecular weights).
Sample solution: DMF solution with the said content of the copolymer being 0.5 wt %
Injection volume of sample solution: 100 μL Raw Materials Used Polymers used to prepare CNT dispersions of Examples and comparative examples and the details of their raw materials are as shown in Tables 1 and 2 and as described in the following.
(Monomer A)
  SMA: stearyl methacrylate (Shin-Nakamura Chemical Co., Ltd., Product number: NK-Ester S) ($R^4$: $C_{18}H_{37}$)
(Monomer B)
  HEMA: 2-hydroxyethyl methacrylate (FUJIFILM Wako Pure Chemical Corporation)
  PEGMA (EO1): methoxyethyl methacrylate (Tokyo Chemical Industry Co., Ltd.)
  PEGMA (EO2): methoxy polyethyleneglycol methacrylate (Shin-Nakamura Chemical Industries, Ltd., Product number: NK-Ester M-20G, the average number of moles of ethylene oxide added=2)
(Monomer C)
  PEGMA (EO9): methoxy polyethyleneglycol methacrylate (Shin-Nakamura Chemical Industries, Ltd., Product number: NK-Ester M-90G, the average number of moles of ethylene oxide added=9)
  MAA: methacrylic acid (FUJIFILM Wako Pure Chemical Corporation)
  DMAAm: N,N-dimethylacrylamide (Tokyo Chemical Industry Co., Ltd.)
  MAAm: methacrylamide (Tokyo Chemical Industry Co., Ltd.)
(Other Raw Materials)
  MPD: 3-mercapto-1,2-propanediol (FUJIFILM Wako Pure Chemical Corporation)
  NMP: N-methyl-2-pyrrolidone (FUJIFILM Wako Pure Chemical Corporation)
  V-65B: 2,2'-azobis (2,4-dimethylvaleronitrile) (FUJIFILM Wako Pure Chemical Corporation)
(Dispersants Used for Preparation of Conductive Material Dispersions of Comparative Examples
  PVP (K-30): FUJIFILM Corporation (the average molecular weight: 40,000)
  PVA-205: Kuraray Co., Ltd. (the calculated molecular weight: 25,000)

TABLE 1

| Table 1 | | | General Formula (1) | | | | | General Formula (2) | | | | | | General Formula (3) | | | | | | |
|---|---|---|---|---|---|---|---|---|---|---|---|---|---|---|---|---|---|---|---|---|---|
| | | | $X^1$ | $R^1$ | $R^2$ | $R^3$ | $R^4$ | X | p | $R^5$ | $R^6$ | $R^7$ | $R^8$ | $R^9$ | $X^3$ | q | $R^{10}$ | $R^{11}$ | $R^{12}$ | $R^{13}$ | $R^{14}$ |
| Structural unit A | Structural Unit $a^1$ | SMA | O | H | H | $CH_3$ | $C_{18}H_{37}$ | | | | | | | | | | | | | | |
| Structural unit B | Structural unit $b^1$ | HEMA | | | | | | O | 1 | H | H | $CH_3$ | $C_2H_4$ | H | | | | | | | |
| | Structural unit $b^2$ | PEGMA (EO1) | | | | | | O | 1 | H | H | $CH_3$ | $C_2H_4$ | $CH_3$ | | | | | | | |
| | Structural unit $b^3$ | PEGMA (EO2) | | | | | | O | 2 | H | H | $CH_3$ | $C_2H_4$ | $CH_3$ | | | | | | | |
| Structural unit C | Structural unit $c^1$ | PEGMA (EO9) | | | | | | | | | | | | | O | 9 | H | H | $CH_3$ | $C_2H_4$ | $CH_3$ |

TABLE 2

| | | Components | | | | | | | | | |
|---|---|---|---|---|---|---|---|---|---|---|---|
| | | Monomer that provides structural unit A | Monomer that provides structural unit B | | | Monomer that provides structural unit C | | | | | |
| Table 2 | Copolymer | SMA | HEMA | PEGMA (EO1) | PEGMA (EO2) | PEGMA (EO9) | MAA | DMAAm | MAAm | LMA | Mw |
| Examples | A | 60 | 40 | | | | | | | | 45,000 |
| | B | 50 | 50 | | | | | | | | 65,000 |

TABLE 2-continued

| Table 2 | | Copolymer | Monomer that provides structural unit A SMA | Monomer that provides structural unit B | | | Monomer that provides structural unit C | | | | | Mw |
|---|---|---|---|---|---|---|---|---|---|---|---|---|
| | | | | HEMA | PEGMA (EO1) | PEGMA (EO2) | PEGMA (EO9) | MAA | DMAAm | MAAm | LMA | |
| | | C | 44 | 30 | 26 | | | | | | | 75,000 |
| | | D | 60 | 20 | | 20 | | | | | | 61,000 |
| | | E | 44 | 30 | | 26 | | | | | | 61,000 |
| | | F | 44 | 30 | | | 26 | | | | | 56,000 |
| | | G | 44 | 44 | | | 12 | | | | | 47,000 |
| | | H | 44 | 36 | | | | 20 | | | | 52,000 |
| | | I | 44 | 36 | | | | | 20 | | | 39,000 |
| | | J | 44 | 36 | | | | | | 20 | | 66,000 |
| | | K | 60 | | | 40 | | | | | | 57,000 |
| | | L | 44 | | | 26 | | | | 30 | | 34,000 |
| Comparative | | M | 30 | | | | 70 | | | | | 77,000 |
| Examples | | N | 44 | | | | 26 | 30 | | | | 95,000 |
| | | O | 44 | | | | 26 | | | 30 | | 40,000 |
| | | P | 20 | | | 10 | | | | | 70 | 42,000 |

\* The unit of the numerical values regarding the respective components is "g".

Synthesis Example of Copolymer A

As a "monomer solution to be added dropwise", a mixed solution was prepared by mixing 60 g of SMA, 40 g of HEMA, and 70 g of NMP. As an "initiator solution", a mixed solution was prepared by mixing 1.0 g of V-65B and 5 g of NMP. As an "initiator solution to be added dropwise", a mixed solution was prepared by mixing 1 g of V-65B and 30 g of NMP. 50 g of NMP and the above-described initiator solution were added to a separable flask (reaction vessel) equipped with a reflux tube, a stirring device, a thermometer, and a nitrogen inlet tube. The reaction vessel was purged with nitrogen, and then the temperature inside the vessel (the temperature of the raw materials placed therein) was set to 65° C. by heating. After the temperature of the vessel had reached 65° C., the above-described "monomer solution to be added dropwise" and "initiator solution to be added dropwise" were concurrently added dropwise to the vessel over 3 hours while stirring in the vessel. After adding these solution, the resultant mixture was further stirred at 65° C. for 1 hour. Subsequently, the temperature inside the vessel was raised to 75° C. over about 30 minutes while continuously stirring the mixture. After the temperature had reached 75° C. the mixture was further stirred for 2 hours in the vessel. Then, the vessel was cooled in a water bath to lower the temperature inside the vessel to 40° C. or lower. For concentration adjustment, NMP was added to the vessel and mixed with the mixture in the vessel. As a result, 257 g of an NMP solution of the copolymer A was obtained as a CNT dispersant composition. The nonvolatile content of the copolymer A solution was 40 mass %, and the weight-average molecular weight of the copolymer A was 45,000.

Synthesis Examples of Copolymers B to P

NMP solutions of copolymers B to P (nonvolatile content: 40 mass %) were obtained as CNT dispersant compositions in the same manner as described in the "Synthesis Example of Copolymer A" section above, except that, in preparation of "monomer solutions to be added anywise", the masses of the monomers used for the synthesis of the copolymers B to P were set to the values shown in Table 2, respectively Method for Preparing Conductive Material Dispersion 1

5 g of the NMP solution of the copolymer A (the solid content: 2 g), which is the CNT dispersant composition, was added to 185 g of NMP, and then, 10 g of MWCNTs in the form of fibrous carbon nanostructures (with a diameter of 12 nm and a length of 40 um according to the catalog) were further added thereto. As a result, a exude dispersion was obtained. Thereafter, the crude dispersion containing MWCNTs and the copolymer A was placed in a high-pressure homogenizer (manufactured by Beryu corp., Product name "BERYU MINI") equipped with a multi-stage pressure regulator (multi-stage step-down transformer) for applying a back pressure during dispersion. Then, the crude dispersion was subjected to a dispersion treatment at a pressure of 100 MPa. Specifically, the MWCNTs were dispersed by applying a shear force to the crude dispersion while applying a back pressure, whereby a MWCNT dispersion as a fibrous carbon nanostructure diversion was obtained. The dispersion treatment was performed while causing the dispersion to circulate by repeating a process of injecting the dispersion discharged from the high-pressure homogenizer again into the homogenizer. Such circulation was caused 20 times, and the discharge rate and the injection rate of the dispersion were set to 30 g/min.

The viscosity of the thus-obtained conductive material dispersion was measured at 25° C. It was found that the viscosity was 300 Pa·s and the particle size was 240 nm.

Method for Preparing Conductive Material Dispersions 2 to 16

Conductive material dispersions 2 to 16 were prepared in the same manner as described in the "Method for Preparing Conductive Material Dispersion 1" section above, except that, instead of the NMP solution of the copolymer A, NMP solutions of the copolymers B to P were used, respectively, as CNT dispersant compositions.

Method for Preparing Conductive Material Dispersion 17

A conductive material dispersion 17 was prepared in the same manner as described in the "Method for Preparing Conductive Material Dispersion 1" section above, except that a crude dispersion was prepared in the following manner.

The crude dispersion was obtained by adding 10 g of MWCNTs in the form of fibrous carbon nanostructures (with a diameter of 12 nm and a length of 40 um according to the catalog) to 190 g of an NMP solution in which 2 g of PVP (K-30) had been dissolved as a dispersant.

Method for Preparing Conductive Material Dispersions 18 to 24

Conductive material dispersions 18 to 24 were prepared in the same manner as described in the "Method for Preparing Conductive Material Dispersion 17" section above, except that crude dispersions were prepared using the materials listed in Table 2, respectively.

Preparation of Positive Electrode Paste 0.62 g of each conductive material dispersion, 2.5 g of NMP, and 1.9 g of a PVDF (8%) NMP solution (KF polymer L #7208, Kureha Corporation) were weighed and added into a 50-ml sample vial and stirred uniformly with a spatula. Thereafter, 12 g of LCO (lithium cobalt oxide, Nippon Chemical Industrial Co., Ltd., CELLSEED C-8hV) was added thereto as a positive electrode active material, and the resultant mixture was stirred with the spatula again until uniform. The mixture was further stirred with a planetary centrifugal mixer (AR-100, manufactured THINKY CORPORATION) for 5 minutes. As a result, a positive electrode paste was obtained. The mass ratio among the positive electrode active material, the binder (PVDF), and the conductive agent (CNTs) was set to 98.5:1.25:0.25 (in terms of solid content), and the solid content (mass %) of the positive electrode paste was set to 71.6 mass %. The solid content of the positive electrode paste refers to the mass % of the solid content of the materials contained in the positive electrode paste, namely, the copolymer, the positive electrode active material, the conductive agent, and the binder.

Measurement of Resistance of Positive Electrode Mixture Layer

The positive electrode paste prepared in the manner described in the "Preparation of Positive Electrode Paste" section above was dropped on a polyester film and uniformly applied on the polyester film using a 100-μm applicator. The coated polyester film was dried at 100° C. for 1 hour, whereby a 40 μm-thick positive electrode mixture layer was obtained.

The volume resistance value was measured at a limit voltage of 10 V using a Loresta-GP (Mitsubishi Chemical Analytech Co., Ltd.) equipped with a PSP probe. The results are shown in Table 3

TABLE 3

| Table 3 | Conductive material dispersion | Conductive material (CNT) | | | Copolymer | | | | | Properties of conductive material dispersion | | Resistance of positive electrode coating |
|---|---|---|---|---|---|---|---|---|---|---|---|---|
| | | Diameter [nm] | Length [nm] | Mass % | Type | Mass % | Relative to conductive material[1] | Solvent Type | Mass % | Viscosity [Pa·s] | Particle size [nm] | [Ω·cm] |
| Ex. 1 | 1 | 12 | 40 | 5 | A | 1 | 20% | NMP | 94.0 | 300 | 240 | 23.0 |
| Ex. 2 | 2 | 12 | 40 | 5 | B | 1 | 20% | NMP | 94.0 | 160 | 210 | 22.0 |
| Ex. 3 | 3 | 12 | 40 | 5 | C | 1 | 20% | NMP | 94.0 | 130 | 180 | 25.0 |
| Ex. 4 | 4 | 12 | 40 | 5 | D | 1 | 20% | NMP | 94.0 | 220 | 220 | 21.0 |
| Ex. 5 | 5 | 12 | 40 | 5 | E | 1 | 20% | NMP | 94.0 | 100 | 175 | 17.5 |
| Ex. 6 | 6 | 12 | 40 | 5 | F | 1 | 20% | NMP | 94.0 | 130 | 175 | 19.0 |
| Ex. 7 | 7 | 12 | 40 | 5 | G | 1 | 20% | NMP | 94.0 | 210 | 200 | 21.5 |
| Ex. 8 | 8 | 12 | 40 | 5 | H | 1 | 20% | NMP | 94.0 | 280 | 220 | 24.5 |
| Ex. 9 | 9 | 12 | 40 | 5 | I | 1 | 20% | NMP | 94.0 | 240 | 200 | 23.0 |
| Ex. 10 | 10 | 12 | 40 | 5 | J | 1 | 20% | NMP | 94.0 | 350 | 240 | 22.0 |
| Ex. 11 | 11 | 12 | 40 | 5 | K | 1 | 20% | NMP | 94.0 | 315 | 230 | 28.0 |
| Ex. 12 | 12 | 12 | 40 | 5 | L | 1 | 20% | NMP | 94.0 | 360 | 285 | 26.0 |
| Comp. Ex. 1 | 13 | 12 | 40 | 5 | M | 1 | 20% | NMP | 94.0 | 740 | 353 | 36.5 |
| Comp. Ex. 2 | 14 | 12 | 40 | 5 | N | 1 | 20% | NMP | 94.0 | 980 | 335 | 42.5 |
| Comp. Ex. 3 | 15 | 12 | 40 | 5 | O | 1 | 20% | NMP | 94.0 | 820 | 380 | 39.5 |
| Comp. Ex. 4 | 16 | 12 | 40 | 5 | P | 1 | 20% | NMP | 94.0 | 1850 | 850 | 60.0 |
| Comp. Ex. 5 | 17 | 12 | 40 | 5 | PVP (K·30) | 1 | 20% | NMP | 94.0 | 760 | 300 | 45.0 |
| Comp. Ex. 6 | 18 | 12 | 40 | 5 | PVA·205 | 1 | 20% | NMP | 94.0 | 690 | 290 | 51.0 |
| Ex. 13 | 19 | 5 | 100 | 5 | F | 1 | 20% | NMP | 94.0 | 810 | 610 | 19.5 |
| Ex. 14 | 20 | 5 | 100 | 5 | F | 1.5 | 30% | NMP | 93.5 | 680 | 530 | 23.0 |
| Ex. 15 | 21 | 5 | 100 | 5 | F | 2 | 40% | NMP | 93.0 | 570 | 420 | 26.5 |
| Comp. Ex. 7 | 22 | 5 | 100 | 5 | N | 1 | 20% | NMP | 94.0 | 2560 | 1360 | 38.0 |
| Comp. Ex. 8 | 23 | 5 | 100 | 5 | N | 1.5 | 30% | NMP | 93.5 | 1890 | 1050 | 52.0 |
| Comp. Ex. 9 | 24 | 5 | 100 | 5 | N | 2 | 40% | NMP | 93.0 | 1250 | 820 | 65.0 |

[1] Mass ratio (copolymer/conductive material) × 100

As can be seen from Table 3, the viscosities of the conductive material dispersions of Examples 1 to 15 are lower than the viscosities of the CNT dispersions of the comparative examples. These results demonstrate that the dispersibility of CNTs is improved in a conductive material dispersion containing the structural unit A represented by the general formula (1) and a specific amount of the structural unit (B) represented by the general formula (2). Also, the resistance values of the positive electrode mixture layers prepared using the positive electrode pastes containing the conductive material dispersions of Examples 1 to 15 were lower than the resistance values of the positive electrode mixture layers prepared using the positive electrode pastes containing the conductive material dispersions of the comparative examples. In particular, the copolymers including the structural units $a^1$ and $b^1$ particularly effectively lowered the resistance values of the positive electrode mixture layers, and the copolymers including the structural units $a^1$, $b^1$, and $c^3$ and the copolymers including the structural units $a^1$, $b^1$, and $c^1$ still more effectively lowered the resistance values of the positive electrode mixture layers.

INDUSTRIAL APPLICABILITY

The conductive material dispersion of the present invention contains a copolymer that includes a structural unit A represented by the general formula (1) and a specific amount of a structural unit B represented by the general formula (2). This allows CNTs to exhibit high dispersibility in the conductive material dispersion. Accordingly, using the conductive material dispersion of the present invention to prepare a positive electrode paste for batteries can contribute to the reduction of the resistance of a positive electrode mixture layer.

The invention claimed is:

1. A dispersant composition for carbon nanotubes comprising:
    a copolymer that includes a structural unit A represented by the following general formula (1) and a structural unit B represented by the following general formula (2); and
    a solvent,
    wherein the content of the structural unit B in all structural units of the copolymer is 20 mass % or more:

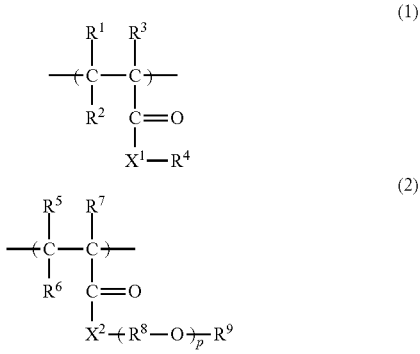

where $R^1$, $R^2$, $R^3$, $R^5$, $R^6$, and $R^7$ are the same or different from each other and are each a hydrogen atom, a methyl group, or an ethyl group, $R^4$ is a hydrocarbon group having 16 to 30 carbon atoms, $R^8$ is a linear or branched alkylene group having 2 to 3 carbon atoms, $X^1$ is an oxygen atom or NH, $X^2$ is an oxygen atom, p is the number of 1 to 8, and $R^9$ is a hydrogen atom, a methyl group, or an ethyl group,
wherein, in the structural unit B represented by the general formula (2), a structural unit $b^1$ in which $X^2$ is an oxygen atom, p is 1, and $R^9$ is a hydrogen atom accounts for 50 mass % or more of the total amount of the structural unit B, and
wherein the copolymer includes the structural unit B that includes both the structural unit $b^1$ and at least one structural unit selected from a structural unit $b^2$ in which $X^2$ is an oxygen atom, p is 1, and $R^9$ is a methyl group and a structural unit $b^3$ in which $X^2$ is an oxygen atom, p is 2, and $R^9$ is a methyl group, or the copolymer further includes at least one structural unit C selected from structural units represented by the following general formula (3), structural units derived from acrylic acid monomers, structural units derived from (meth) acrylic acid esters having 1 to 15 carbon atoms, and structural units derived from (meth)acrylamides:

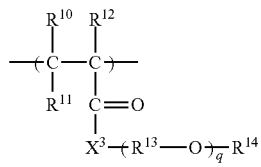

where $R^{10}$, $R^{11}$, $R^{12}$, and $R^{14}$ are the same or different from each other and are each a hydrogen atom, a methyl group, or an ethyl group, $R^{13}$ is a linear or branched alkylene group having 2 to 4 carbon atoms, $X^3$ is an oxygen atom, and q is the number of 9 to 10.

2. The dispersant composition for carbon nanotubes according to claim 1,
    wherein the total content of the structural unit A and the structural unit B in all the structural units of the copolymer is 50 mass % or more.

3. The dispersant composition for carbon nanotubes according to claim 1,
    wherein the content of the structural unit A in all the structural units of the copolymer is 20 mass % or more and 80 mass % or less.

4. The dispersant composition for carbon nanotubes according to claim 1,
    wherein the ratio of the content of the structural unit B to the content of the structural unit A (the structural unit B/the structural unit A) in the copolymer is 0.08 or more and 2.5 or less.

5. The dispersant composition for carbon nanotubes according to claim 1,
    wherein the content of the structural unit B in all the structural units of the copolymer is 80 mass % or less.

6. The dispersant composition for carbon nanotubes according to claim 1,
    wherein the structural unit C is at least one structural unit selected from structural units represented by the general formula (3) where $X^3$ is an oxygen atom, q is 9 to 10, $R^{10}$ and $R^{11}$ are each a hydrogen atom, $R^{12}$ is a hydrogen atom or a methyl group, $R^{13}$ is an ethylene group, and $R^{14}$ is a methyl group, structural units derived from at least one monomer selected from acrylic acid and methacrylic acid, and structural units derived from at least one monomer selected from acrylamide, methacrylamide, dimethylacrylamide, and dimethylmethacrylamide.

7. The dispersant composition for carbon nanotubes according to claim 1,
    wherein the copolymer has a weight-average molecular weight of 5,000 or more and 200,000 or less.

8. A conductive material dispersion comprising:
    a dispersant composition for carbon nanotubes comprising:
    a copolymer that includes a structural unit A represented by the following general formula (1) and a structural unit B represented by the following general formula (2); and
    a solvent,
    wherein the content of the structural unit B in all structural units of the copolymer is 20 mass % or more:

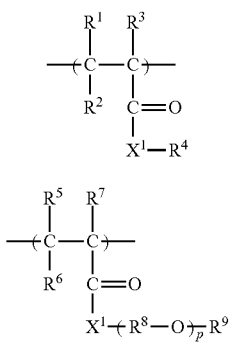

where $R^1$, $R^2$, $R^3$, $R^5$, $R^6$, and $R^7$ are the same or different from each other and are each a hydrogen atom, a methyl group, or an ethyl group, $R^4$ is a hydrocarbon group having 16 to 30 carbon atoms, $R^8$ is a linear or branched alkylene group having 2 to 3 carbon atoms, $X^1$ is an oxygen atom or NH, $X^2$ is an oxygen atom, p is the number of 1 to 8, and $R^9$ is a hydrogen atom, a methyl group, or an ethyl group, wherein, in the structural unit B represented by the general formula (2), a structural unit $b^1$ in which $X^2$ is an oxygen atom, p is 1, and $R^9$ is a hydrogen atom accounts for 50 mass % or more of the total amount of the structural unit B; and carbon nanotubes.

9. The conductive material dispersion according to claim 8, wherein the carbon nanotubes have an average diameter of 3 nm or more and 100 nm or less and an average length of 2 μm or more and 500 μm or less.

10. The conductive material dispersion according to claim 8, wherein, when the content of the carbon nanotubes is 5 mass %, the viscosity of the conductive material dispersion at 25° C. and at a shear rate of 1 (1/s) is 1000 Pa·s or less.

11. The conductive material dispersion according to claim 8, wherein the particle size of the carbon nanotubes as determined by a dynamic light scattering method is 100 nm or more and 1000 nm or less.

12. The conductive material dispersion according to claim 8, wherein the content of the carbon nanotubes is 1 mass % or more.

13. The conductive material dispersion according to claim 8, wherein the mass ratio between the copolymer and the carbon nanotubes (the copolymer/the carbon nanotubes) is 0.05 or more and 1 or less.

14. The conductive material dispersion according to claim 8, wherein the solvent is N-methyl-2-pyrrolidone.

15. A positive electrode paste for a battery, comprising: the conductive material dispersion according to claim 8; a positive electrode active material; and a binder.

* * * * *